March 22, 1960

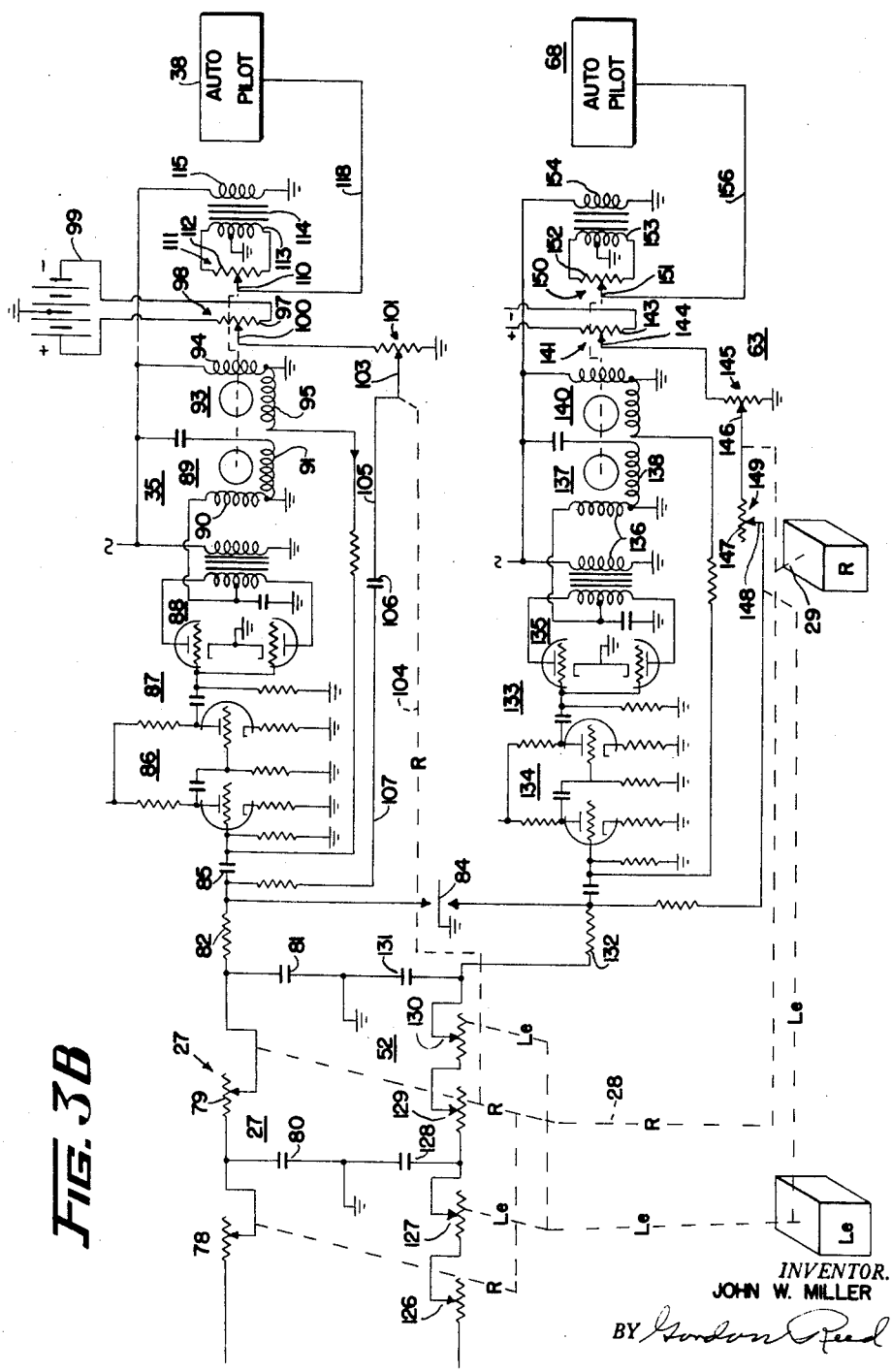

J. W. MILLER 2,929,585

AUTOMATIC PILOT

Filed Nov. 25, 1955

INVENTOR.
JOHN W. MILLER

BY Gordon Reed

ATTORNEY

March 22, 1960

J. W. MILLER 2,929,585

AUTOMATIC PILOT

Filed Nov. 25, 1955

INVENTOR.
JOHN W. MILLER
BY Gordon C. Reed
ATTORNEY

United States Patent Office 2,929,585
Patented Mar. 22, 1960

2,929,585

AUTOMATIC PILOT

John W. Miller, St. Paul, Minn., assignor to Minneapolis-Honeywell Regulator Company, Minneapolis, Minn., a corporation of Delaware Application November 25, 1955, Serial No. 548,972

20 Claims. (Cl. 244—77)

This invention relates to control systems and more particularly to automatic navigation control systems for aircraft. Aircraft have been heretofore provided with automatic pilots for maintaining aircraft on a predetermined heading and in a desired attitude both laterally and longitudinally. While such automatic pilots maintain the craft in desired attitudes they are of little assistance in controlling the flight path of an aircraft. To control to a desired flight path, it has been found necessary in some instances to introduce a control effect from an external source rather than from the automatic pilot. Illustrative of such control effects are instrument landing system signals provided by a pattern of overlapping radio signals, to define a ground track.

Although instrument landing system signals are effective to control the flight path of an aircraft with respect to a fixed ground track, object, or landing runway associated with the earth, they are not adapted to control the flight path of the craft with respect to a track, object, or runway which itself has a rather high velocity.

One object therefore of this invention is to automatically control the flight path of an aircraft so that it attains a given positional relationship with respect to an object which itself has a substantial velocity.

A further object of this invention is to automatically control the flight path of an aircraft with respect to a moving object so that a desired positional relationship is effected at a predetermined time.

A further object of this invention is to automatically control the flight path of an aircraft with respect to a rapidly moving object so that the craft is in a desired position relative to the object while there is yet an interval of time or distance remaining.

A further object of this invention is to automatically control the flight path of an aircraft in a vertical and a horizontal direction with respect to a rapidly moving object so that the craft is in a desired position relative to the object while there is an interval remaining between them.

A further object of this invention is to utilize electrical vectors obtained in one set of coordinates and converting them into a second set of coordinates and utilizing the converted vectors in the automatic solution of the flight path problem of an aircraft to provide a given positional relationship between said craft and a moving object.

Still another object of the present invention is to provide a computer for converting information in the form of electrical vectors based upon an arbitrary set of geometric coordinates into electrical outputs ascertainable in terms of a difference set of geometric coordinates.

The foregoing and further objects and advantages of the invention will appear more fully hereinafter from a consideration of the detailed description which follows taken together with the accompanying drawings wherein one embodiment of the invention is illustrated by way of example.

In the drawings, wherein like reference numerals refer to like parts:

Figure 3A:
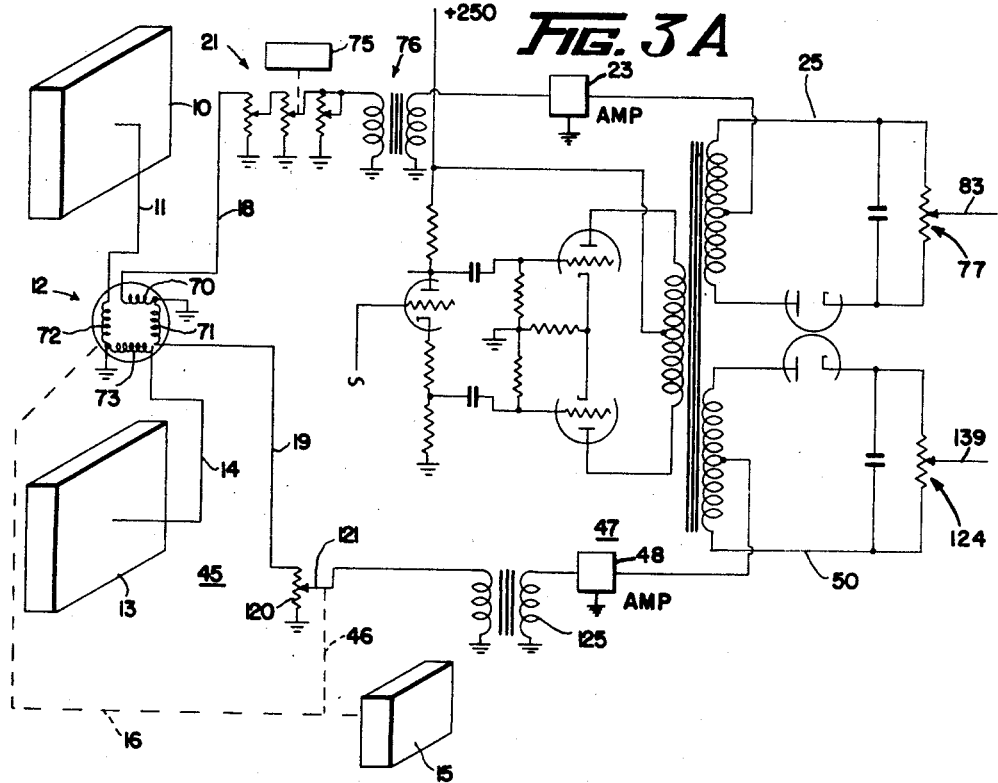

Figures 3A and 3B comprise an electrical schematic diagram of a novel automatic navigational control system of the present invention.

Figure 1:
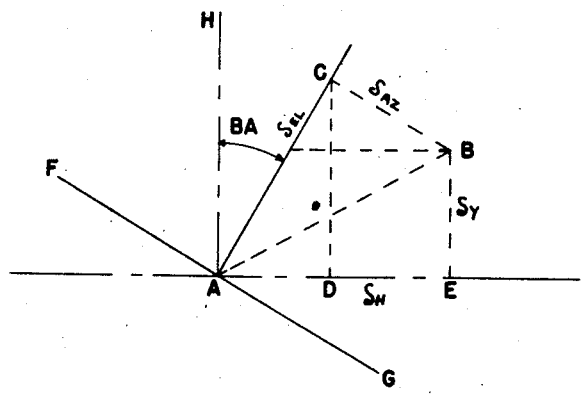
Figure 1 is a schematic diagram showing the positional relationship of the craft and an object in two sets of coordinates.

Referring to Figure 1, the relationship between the coordinate distances of an object B from a point A in terms of aircraft coordinates and earth geographical coordinates is as follows:

$$\delta H = \delta EL \sin BA + \delta AZ \cos BA$$
$$\delta Y = \delta EL \cos BA - \delta AZ \sin BA$$

In the relationship stated, angle BA is the bank angle of the craft or the angular departure of its vertical axis AC from the geographical vertical AH. $\delta EL$ is the elevation of the point B above the plane of the aircraft defined by its lateral axis FG and its longitudinal axis through point A and perpendicular to the plane of the drawing. $\delta AZ$ is the distance of point B from the vertical through the turn axis of the aircraft. The line AE represents the earth geographical horizontal and line AH represents the geographical vertical. It will thus be apparent that when the aircraft is controlled by an automatic pilot which has a sensing device such as a vertical gyroscope slaved to earth coordinates by conventional gravitational responsive means that in order for the craft to reach point B from point A it will move horizontally a distance AE and vertically a distance EB. If desired, the distances may be considered as velocities in which EB is the vertical velocity and AE is the velocity in the horizontal plane.

Figure 2:
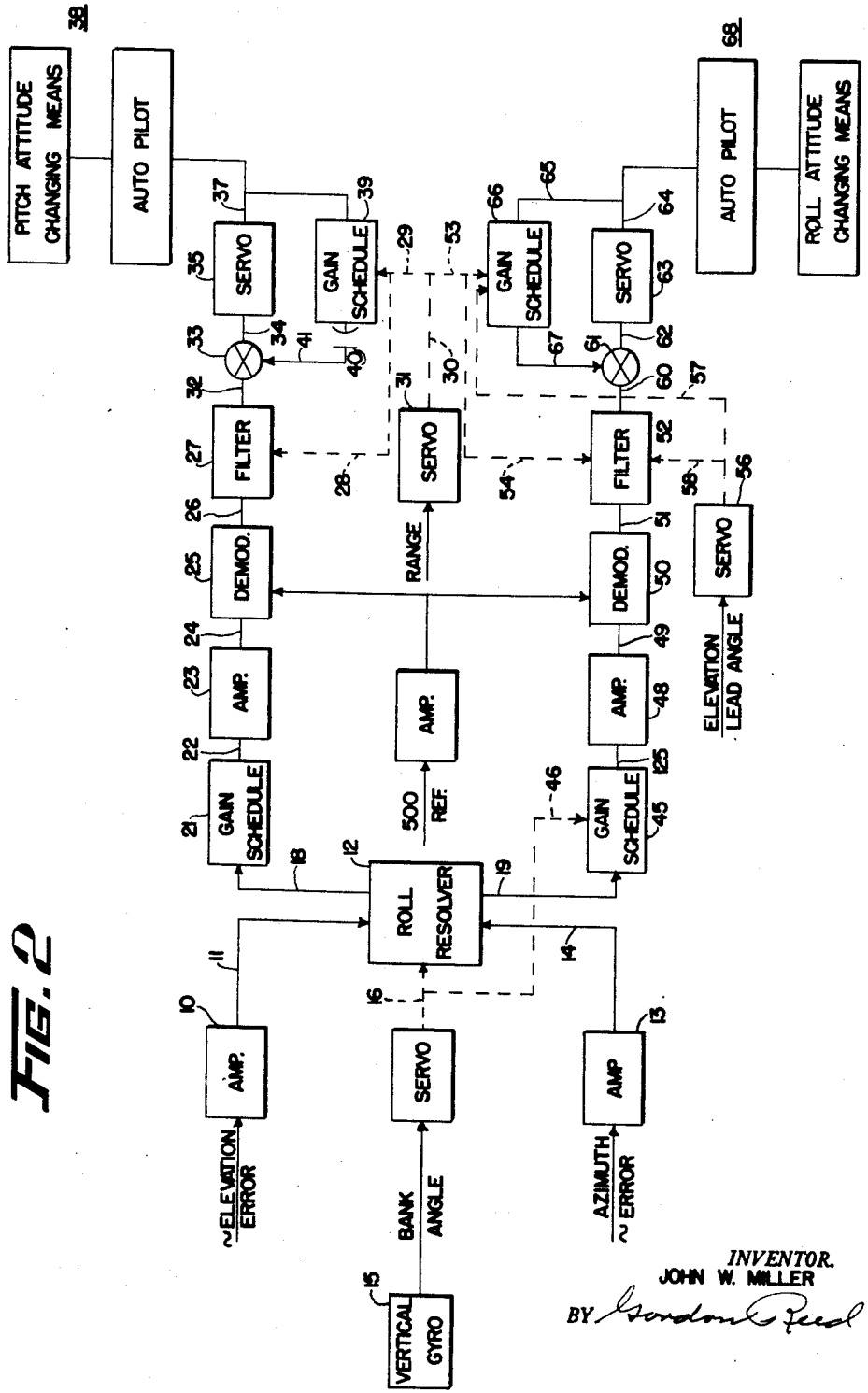
Figure 2 is a block diagram of the control apparatus.

Such transformation of coordinates is actually effected through a resolver in an aircraft control apparatus which may be more fully considered in Figure 2. In Figure 2 two control signals in terms of aircraft coordinates are modified to control an automatic pilot having as a sensing unit a gravitational responsive vertical gyroscope 15. One signal identified as an elevational error signal and which represents the change in velocity in yards per second in the direction of the craft's turn or vertical axis that the craft should have is supplied from an existing device 10 and transmitting means 11 to a roll resolver 12. The second signal, identified as an azimuth error signal, represents the yards per second change of velocity that the craft should have in its lateral plane defined by its pitch axis and longitudinal axis. This signal is derived from a device 13 and transmitted through transmission means 14 to the roll resolver 12. Another portion of the inductive resolver 12 is operated in accordance with the bank angle of the aircraft. This operation may be effected through a vertical gyroscope 15 responsive to bank of the craft and its transmission means 16. One output on conductor 18 from the roll resolver 12 represents the control signal for controlling the craft about its pitch axis, another output on conductor 19 from the roll resolver 12 represents the control signal for controlling the craft about its roll axis. The signal on output conductor 18 may be an alternating voltage signal, and it is applied to a true air speed responsive gain scheduling device 21 so that the signal output on conductor 22 of the scheduling device decreases for increase in true air speed. The signal output conductor 22 is connected to an amplifier 23 and its output on conductor 24 is supplied to a demodulator 25 where the A.C. signal is converted to a D.C. signal. The output from demodulator 25 is supplied through transmission means 26 to a filter 27. The filter 27 contains adjustable elements which modify the ratio of the signal on filter input transmission means 26 with respect to its output on element 32 in order to reduce the "noise" component of the electrical signal. The filter 27 is adjusted in accordance with the distance of the craft to the object which adjustment is effected through a servo device 31 having an output proportional to the range from craft to object and operating through transmission members 29, 28 to adjust filter 27. The output of the filter 27 is supplied through a conductor 32 to a summing member 33 and in turn its output member 34 is applied to a servo 35. The servo 35 has its output member 37 so arranged that the output is fed back through a gain scheduling device 39, which is adjusted in accordance with range, a high pass filter 40 and transmission means 41 to the summing member 33. The output member 37 of servo 35 also drives into a pitch control channel 38 of an existing automatic pilot of the type having a displacement type vertical gyro for sensing pitch attitude of the craft. The output of the autopilot channel 38 controls devices for changing the pitch attitude of the craft. The roll resolver output on member 19 which is identified as the azimuth error in yards per second is transmitted to a gain scheduling device 45 which is adjusted in accordance with the bank angle of the craft through an operating means 46. The purpose of the gain scheduling device 45 is to linearize the rate of turn of the craft in azimuth so that it is directly proportional to the bank angle. The output signal of gain scheduling device 45 is applied to transmission means 125 and thence to amplifier 48 from which through transmission means 49 it is applied to an A.C. to D.C. demodulator 50. Transmission means 51 connects demodulator 50 to a filter 52. The filter is of the adjustable type and is adjusted in accordance with range from the craft to the object by the operating means 36, 53, and 54. Additionally the filter 52 is adjusted in accordance with the elevation lead angle by a servo device 56, operated in accordance with elevation lead angle, through an operating means 58. The elevation lead angle is defined as the angle that the object is above the plane defined by the craft longitudinal and lateral axes. The output from filter 52 passes through transmission means 60 and summing means 61 to a transmission means 62 connected to a servo 63. The output member 64 of the servo 63 is connected through a follow-up member 65 to provide a feedback signal. This feedback signal is modified through a gain scheduling device 66 from which it is supplied through transmission numbers 67 to the summing device 61. The feedback signal is modified in the gain scheduling device 66 in accordance with the range by operating means 53 and also in accordance with the elevation lead angle by operating means 57.

The output members 64 of the servo 63 is also connected to the bank attitude control channel 68 of an automatic pilot having a vertical gyro for sensing bank attitude which autopilot in turn operates bank attitude control devices of the craft.

It will be thus seen from Figure 2 that elevation and azimuth errors which are received in terms of aircraft coordinates are resolved into earth or geographical coordinates, vertical and horizontal. Thereafter, these converted error signals are filtered or scheduled with the filtering varying with two parameters. In the horizontal channel, range and elevation lead angle are the parameters whereas in the vertical channel, range is the only parameter. Also the feedback gain through the servos 35 and 63 are varied or scheduled with the same respective parameters. In the vertical axis, the signal is also modified in accordance with true air speed and the integral of the error represented by means 41 is summed with the error represented by conductor 32 to give the effect of controlling to pitch rate instead of pitch attitude. Also in the horizontal channel, the horizontal correction is modified in accordance with the bank angle of the craft in order to linearize the rate of turn or to make the rate of turn of the craft proportional to the called for bank signal on conductor 19.

In Figures 3A, 3B which show one physical embodiment of the arrangement, the resolver 12 comprises two pair of windings 70, 71 and 72, 73. Windings 72 and 73 are respectively at right angles to each other as is also true of windings 70, 71. Normally, winding 70 is parallel with winding 73. Winding 72 is energized in accordance with the elevation error by the conductor 11 extending therefrom to the elevation error providing device 10. Similarly, winding 73 is energized in accordance with azimuth error by the conductor 14 extending thereto from the azimuth error providing device 13. The windings as viewed in Figure 3A may be considered in a plane perpendicular to the roll axis of the craft. Windings 72 and 73 are rotated relative to windings 70, 71 in accordance with the bank angle of the craft. The rotation of the energized windings 72, 73 is effected through an operating means 16 from a device 15. The device 15 may be a vertical gyroscope responsive to departure of the vertical axis of the craft from the geographical vertical during bank of the craft or some similar arrangement may be provided to adjust operating member 16 in accordance with the bank angle of the craft.

A transfer of coordinates is effected through the resolver 12 as more fully discussed with respect to Figure 1 and the vertical craft control signal is transmitted from the resolver 12 through conductor 18 to the true air speed gain scheduling device 21. The true air speed gain scheduling device 21 may comprise a plurality of voltage dividing potentiometers having their resistors connected between ground and a source of voltage. One of the potentiometer resistors may be directly connected to conductor 18 and the succeeding potentiometer resistors may be connected to adjacent antecedent potentiometer sliders. Two of the potentiometer sliders may be adjusted in accordance with true air speed by a device 75 responsive to true air speed. The A.C. output from the scheduling device 21 is a control signal that varies inversely with the true air speed of the craft. The output from the gain scheduling device 21 is applied through a transformer coupling 76 to an electronic amplifier section 23 thence to a phase sensitive demodulator 25. The demodulator 25 is supplied with a standard A.C. voltage to one of its control electrodes in a well known manner. The D.C. output of the demodulator 25 is applied from a centering potentiometer 77 and conductor 83 to a filter 27. The D.C. control signal, output, disregarding amplifier 23, is between the grounded end of the secondary of transformer 76 and the slider of potentiometer 77. This slider may be adjusted to give zero output at zero control signal. The filter 27 is of the two section resistor-capacitor type, resistor input. It comprises variable resistors 78, 79 and fixed resistor 82 along with capacitors 80, 81. Resistors 78 and 79 are both adjusted in accordance with distance of the craft from the object in such manner that the resistances are increased for increase in range. The D.C. output from filter 27 is supplied from resistor 82 to a D.C. to A.C. convertor 84. This convertor may be a conventional vibrator. The resultant A.C. output from the converter 84 is supplied to an amplifier section 86 of an amplifier-discriminator 87. This application of the A.C. to the amplifier 86 is effected through a coupling condenser 85. The output of the amplifier section 86 is applied to an A.C. discriminator section 88 having its output in turn applied to an amplifier energized winding 90 of a capacitor type induction motor 89 the remaining winding 91 thereof being energized from a 400 cycle supply. Such amplifier, discriminator, motor combinations are old in the art, see for example the U.S. patent to Upton No. 2,423,534, or Beers No. 2,020,275.

The motor 89 operates a dynamic transformer or velocity signal generator 93 having a primary winding 94 connected to the A.C. supply and its secondary winding 95 connected to the input side of amplifier 86. The motor 89 also positions a slider 100 of a potentiometer 98 having its resistor 97 connected across a D.C. voltage source 99 having a grounded center tap. A voltage dividing potentiometer 101 has its resistor connected between the motor driven slider 100 and the battery center tap ground. Potentiometer voltage divider 101 includes an adjustable tap 103 which is positioned in accordance with the range or distance of the craft to the object through a suitable operating means 104 extending from the operating means 28. The adjustable tap 103 is connected through conductor 105, capacitor 106, and conductor 107 to the input side of amplifier 86. By means of the feedback provided by potentiometer 97 and effected through the capacitor 106, the displacement of slider 100 from a point on resistor 97 may be considered an integral of the control signal supplied from resistor 82 to amplifier 86. Potentiometer 98 is linear but potentiometer 101 is nonlinear, i.e., it is a function of range and of the nonlinearities in the means supplying error signals. The configuration of the potentiometer is determined by stability and noise requirements. It defies a simple word description and may be obtained graphically.

The motor 89 additionally drives a slider 110 of an output potentiometer 111. The potentiometer 111 includes resistor 112 which is connected across a secondary 113 of a transformer 114 having a primary winding 115 connected to the A.C. supply. The secondary 113 has a grounded center tap and a signal is developed between slider 110 and the center tap of secondary winding 113 as the slider is displaced from the electrical center of resistor 112. This electrical center has a potential corresponding to the grounded center tap of secondary winding 113. A conductor 118 extends from potentiometer slider 110 to the pitch attitude control channel 38 of the automatic pilot. This automatic pilot may be of the type well-known in the art and illustrated by U.S. Patent No. 2,617,615. In said patent, the conductor 50 in the elevator control channel may be replaced by the conductor 118 herein so that the control circuit of amplifier 15 of the patent includes the potentiometer 111 herein.

Having completed the description of the elements controlling the vertical steering signal providing servo 35 which operates its output potentiometer 111, the following discussion pertains to the control of the horizontal steering signal providing servo 63. The horizontal steering signal from resolver 12 is supplied by conductor 19 to the gain scheduling device 45. This device may comprise a potentiometer having a resistor 120 and an adjustable slider 121. The slider 121 is positioned along resistor 120 by an operating means 46 in accordance with the bank angle of the craft. The resistor 120 may be characterized in accordance with $$\frac{BA}{\tan. BA}$$

where BA is the bank angle so that the resultant rate of turn of the craft resulting from its banked attitude is linearly proportional to the signal voltage on conductor 19. A compensation is required by the potentiometer comprising resistor 120 and slider 121 because while the bank angle of the craft would vary directly as the voltage on conductor 19, the rate of turn of the craft is proportional to the tangent of the bank angle and not directly proportional to the bank angle. However the signal on conductor 19 is directly proportional to a desired rate of turn. Thus the potentiometer resistor 120 must be so characterized as to provide an output from the gain device 45 so that the craft rate of turn is linearly proportional to the signal on conductor 19. The output of the scheduling device 45 is supplied through a transformer connection 125 and an amplifier 48 to demodulator 50. The D.C. output of the demodulator 50 is supplied by a centering potentiometer 124 and conductor 139 to a filter 52. This filter comprises two sections, the section adjacent the demodulator section 50 comprises variable resistors 126, 127 and capacitor 128. The second section comprises variable resistors 129, 130, and capacitor 131. As the resistors and capacitors are arranged, the filter is commonly designated a resistor input. The D.C. output from the filter 52 is transmitted through resistor 132 to the D.C. to A.C. convertor such as vibrator 84.

The A.C. output from the vibrator 84 is supplied to an amplifier section 134 of an amplifier-discriminator 133. The amplifier-discriminator 133 constitutes part of the horizontal steering signal providing servo 63 and includes the discriminator section 135. The output of the amplifier section 134 controls the discriminator section 135 which in turn has its output connected to an amplifier energized winding 136 of a capacitor type induction motor 137. The motor includes additionally a winding 138 connected to the A.C. supply. The motor 137 also operates a slider 144 of a feedback potentiometer 141. The potentiometer includes a resistor 143 connected across a D.C. supply source similar to battery 99 and having a grounded center tap. The slider 144 develops a signal between it and the center tap of its resistor energizing source upon displacement of the slider from a point on resistor 143 having a potential corresponding to the center tap of the voltage supply. A gain control potentiometer 145 has one end of its resistor connected to the slider 144 and the opposite end grounded. The gain control potentiometer 145 includes a slider 146 which is adjusted in accordance with the distance of the aircraft from the object. Potentiometer 145 is specially characterized to account for changing stability requirements and compromises in the computer. The arrangement is such that less voltage appears between slider 146 and ground as the range decreases. Thus the motor 137 will be required to move a further distance to balance the input circuit of its amplifier 134 at short ranges than for long ranges or distance of the object from the craft.

The output from potentiometer 145 is supplied to an additional gain control comprising a resistor 147 and an adjustable slider 148. Slider 148 is adjusted in accordance with the lead angle, Le, of the object relative to the craft. The elevation lead angle is the angle that the sight must be tilted up from the plane formed by the wings and longitudinal axis of the craft in order to sight the object. The potentiometer 145 is characterized to account for stability requirements with changing lead angle.

The motor 137 additionally drives a slider 151 of an output potentiometer 150. The potentiometer 151 includes a resistor 152 connected across a transformer secondary winding 153. The winding 153 has a grounded center tap and is energized from a primary winding 154. A signal voltage is developed between slider 151 and a secondary winding center tap as the slider is displaced from a point or electrical center of resistor 152 having a potential corresponding to the secondary winding center tap. The output from the potentiometer 150 is nonlinear and is supplied by a conductor 156 extending from slider 151 to the aileron control channel 68 of a conventional autopilot. For example the conductor 156 may correspond with conductor 163 of Patent No. 2,617,615 whereby the signal from potentiometer 150 is also supplied to the aileron control amplifier network.

When the potentiometer 150 provides a signal into the autopilot for banking the aircraft and thus initiating an ordered rate of turn of the craft, the vertical gyro in the aileron channel will provide an opposing signal causing the streamlining of the ailerons so that the craft attains a rate of turn called for by potentiometer 150. Consequently, in the horizontal steering signal providing servo 63, a positional feedback from potentiometer 141 may be supplied to the input to the amplifier section 134.

In the pitch channel of the autopilot, the signal on resistor 82 in the amplifier is ordering a certain linear rate of change of altitude of the craft. If the servo 35 were merely a positional servo, which would be the case if capacitor 106 were omitted in the feedback connection, the potentiometer 111 would develop a signal proportional to the signal on resistor 82. If this signal were applied to the pitch control axis of the autopilot and the elevator were to be displaced to change craft attitude, the vertical gyroscope responsive to changes in pitch attitude of the craft would exert an opposing signal from that received from potentiometer 111. Consequently, the ordered rate of change of altitude of the craft would be resisted by the pitch attitude signal from the vertical gyroscope. In order to overcome this opposing effect, the capacitor 106 is inserted in the feedback loop from the potentiometer slider 100. Consequently, the potentiometer slider 110 no longer supplies a displacement feedback signal. Instead the signal fed back with the condensor 106 included depends upon the rate of operation of slider 109, and consequently slider 110 of the output potentiometer 111 is positioned in accordance with an integral of the signal on resistor 82 connected to the amplifier 86. By means of this integral control the signal from potentiometer 111 will overcome the effect due to the vertical gyroscope so that the craft will attain the desired rate of change of altitude. When the voltage on resistor 82 does not command any further rate of change of altitude, the motor 89 terminates operation, and the potentiometer 111 remains as adjusted with its output signal balancing that in the pitch channel of the autopilot such as any signal from the vertical gyroscope.

Reverting to the filter 52, the resistors 126, 129 are adjusted in accordance with the distance of the object from the craft. In other words, for increased distance an increase in resistance is effected. Similarly, the resistors 127 and 130 are adjusted in accordance with the elevation lead angle L$e$. The resistance varies directly as the elevation lead angle.

Additionally, while it was stated that the voltage from potentiometer 145 varied directly with the distance of the object from the craft the slider 148 is adjusted so that the voltage fed back from potentiometer 149 increases directly with elevation lead angle.

Summarizing, the signal supplied to the pitch channel of the autopilot by conductor 118 is a command signal calling for a certain number of yards per second change in altitude of the craft in geographical coordinates. Also the signal from potentiometer 150 is a command signal calling for a certain number of yards per second change in a horizontal plane. This velocity in the horizontal plane corresponds with the product of the distance of the craft from the object and the angle of velocity of a line connecting the craft and the object. By commanding the craft so that it assumes the horizontal and altitude velocities ordered, the craft may be caused to follow a course relative to the object. The course as thus followed by the craft under the ordered velocity rates may cause it to contact the object at a desired position in the flight path of the object or to attain a desired position relative to the object at a predetermined time.

It will now be apparent that there has been provided a novel control system for an aircraft which is responsive to input control signals related to the aircraft coordinates and which system modifies said signals and through a novel filtering arrangement and gain changing arrangement reduces the noise component in the control signal in accordance with the range and elevation lead angle between the craft and object to more smoothly control the flight of the aircraft toward its object.

What is claimed is:

1. In an automatic navigating control system for an aircraft having attitude control means for positioning the craft about its pitch axis, in combination: position maintaining means responsive to lateral tilt of the craft relative to the earth; a coordinate converter having two pairs of windings normally in parallel pairs with one pair perpendicular to the other pair when the craft is in a level position laterally; means for rotating one pair of said windings relative to the other pair by said position maintaining means; means for supplying an alternating signal to one of said windings of the other pair in accordance with a desired rate of displacement in the direction of the crafts vertical axis; means for supplying an alternating voltage to the remaining winding of said other pair in accordance with a desired rate of displacement in a plane of the craft lateral and longitudinal axes, whereby one of said windings of said one pair develops an alternating signal in accordance with the desired displacement rate in a direction perpendicular relative to the earth; means for modifying said signal in accordance with craft airspeed; means for converting said A.C. signal to D.C. signal; adjustable filtering means connected to said converter; means for adjusting said filter in accordance with the distance of the craft from an object to obtain from said filter a second signal voltage; a servo means responsive to said second voltage signal; follow-up means developing a signal opposing said second voltage signal and driven by said servo means; and auto pilot means controlled by said servo means for controlling said attitude control means.

2. In a navigational control system for an aircraft, in combination; position maintaining means responsive to lateral tilt of the craft relative to the earth; a coordinate convertor operated by said position maintaining means to convert vector quantities from aircraft coordinates to geographical coordinates; means for energizing said coordinate convertor in accordance with a desired rate of displacement of the craft in the direction of the craft's vertical axis; means for additionally energizing the coordinate convertor in accordance with a desired rate of displacement of the craft in a plane defined by the craft's lateral and longitudinal axes; means energized by the output of said coordinate convertor in accordance with a desired displacement rate in a direction perpendicular relative to the earth's surface; airspeed responsive gain control means modifying said signal inversely proportional to the craft airspeed; adjustable filter means connected to said gain control means and including adjustable means responsive to craft range from an object to vary the filtering effect with range; servo means connected to said filter means and controlled by its output; follow-up means driven by said servo means and opposing said output of the filter; and means for modifying said follow-up signal in accordance with craft range.

3. In an automatic control system for an aircraft having means for positioning the craft about its pitch axis, in combination: a roll attitude responsive means responsive to lateral tilt of the craft relative to the earth; a roll resolver having at least four windings one pair thereof being perpendicular to both windings of said other pair; means operated by said attitude responsive means and adjusting one pair of windings relative to the other; means for energizing two windings of a pair of windings of said resolver respectively in accordance with an elevation error signal and an azimuth error signal of the craft relative to an object; means for positioning a pair of said windings in accordance with the craft roll attitude from said attitude responsive means, to obtain from a third winding an aircraft pitch control signal; means for modifying the gain of said pitch control signal in accordance with craft airspeed; means for filtering said modified pitch control signal; a first servo motor, control means for said servo motor, a follow-up signal providing means operated by said first servo motor; means for modifying said follow-up signal in accordance with the displacement of the craft from said object; and means for applying said two modified signals to said servo control means; an auto pilot for operating said craft pitch attitude changing means; and signal means in said auto pilot operated by said first servo motor.

4. In an automatic control apparatus for an aircraft for controlling its rate of climb, in combination: means for supplying an A.C. signal voltage in accordance with a desired rate of change of linear velocity vertical to the earth of the craft, means for demodulating said signal voltage, a two section resistor-capacitor filter having resistor input connected to said demodulator, an integrating servo motor connected to said filter, a displacement signal generator operated by said servo, means including a capacitor for feeding back said signal from said displacement generator to said servo input, means for modifying the displacement signal in accordance with the linear distance of the craft from an object, and a further signal generating means operated by said servo motor and controlling the vertical velocity of the craft.

5. In flight control apparatus for an aircraft having attitude controlling means, in combination: means providing an A.C. signal voltage in accordance with a desired change in the linear velocity of the craft in a direction; means for demodulating said A.C. voltage; means for filtering said demodulated voltage, said filter comprising two sections each section including a resistor and capacitor and arranged with a resistor input; means for increasing each resistance in accordance with the distance of the craft from an object, to filter out undesirable signal voltage components; a servo motor control section connected to said filter; a feed back servo motor displacement signal generator operated by said servo motor; connections from said servo motor displacement signal generator to said servo motor control section; a further motor displacement signal generator operated by said motor; and autopilot means responsive to said further signal generator and operating the craft's attitude controlling means.

6. The apparatus of claim 5 wherein the feed back displacement signal generator supplies a D.C. signal and wherein said feed back connection includes a capacitor.

7. In flight control apparatus for an aircraft having attitude controlling means, means providing an A.C. signal voltage, having noise components, in accordance with the desired change in the linear velocity of the craft in a direction; means for demodulating said A.C. voltage to a D.C. voltage signal; filtering means for said demodulated voltage said filter comprising two sections each including a resistor and capacitor with a resistor filter input, for filtering the noise from the desirable voltage component; means for increasing each resistance in accordance with the distance of the craft from an object to increase the filtering action with increased distance; modulating means connected to said filter for converting and D.C. signal to an A.C. signal; control means connected to said filter; a servo motor controlled by said control means; a servo motor displacement signal generator operated by said motor; feed back connections from said displacement signal generator to said control means; a further motor displacement signal generator operated by said motor; and autopilot means responsive to said further signal generator and operating the craft's attitude controlling means.

8. In flight control apparatus for an aircraft having attitude controlling means and having an A.C. signal voltage varying proportionally to a desired change in the velocity of the craft in a direction, in combination: means for demodulating said A.C. voltage signal to a D.C. voltage signal; filtering means connected to said demodulator for filtering the D.C. voltage from the demodulator; servo means for controlling the operation of said craft attitude controlling means; a control circuit means for said servo means and adapted to receive said filtered signal; control circuit rebalancing means connected with said control circuit means and operated by said servo means whereby said servo means operates in accordance with an integral of said signal.

9. In aircraft flight control apparatus wherein a signal voltage varying with the velocity of the craft in a direction is produced, autopilot means for causing operation of craft attitude control means of said aircraft to change attitude in said direction; servo means for controlling said autopilot means; a control circuit connected to said servo means; means for connecting said signal voltage to said control circuit; a feed back signal generator operated by said servo means; means for adjusting the output of said signal generator in accordance with the distance of the craft from an object; and means for supplying said adjusted output of the generator of the feed back signal to said control circuit means.

10. Apparatus for controlling the flight path of an aircraft having an automatic pilot thereon and means for providing an A.C. signal varying with the rate of change of vertical displacement of said craft, said apparatus comprising, means for modifying said signal in accordance with the true air speed of the craft; means for converting said A.C. signal to a D.C. signal; filter means connected to said converter for filtering out noise components of said converted signal; a D.C. to A.C. convertor connected to said filter and providing an A.C. output voltage; servo motor means for integrating the A.C. output voltage to provide a resultant signal which is an integral of the time duration of said output voltage; and further means responsive to said servo means and adapted to operate said automatic pilot to effect the desired rate of change of vertical displacement of said craft.

11. A controller apparatus comprising: a source of control signal voltage having noise components; a filter connected to receive said voltage; amplifier means having its input connected to said filter; a servo motor; means for connecting the output of said amplifier to said servo motor; means operated by said servo motor for rebalancing said amplifier; and further means for adjusting the time constant of said filter.

12. In an aircraft flight control apparatus wherein a signal voltage varying in accordance with a desired change in vertical velocity of the craft is provided, autopilot means for controlling an attitude changing means of said aircraft to vary vertical attitude thereof; again control means for modifying said signal voltage in accordance with the true airspeed of the craft; means including a filter connected to said gain control means; means for modifying the time constant of said filter in accordance with the distance of said craft from an object; means including an amplifier connected to said filter; a servo motor connected to the output of said amplifier; a follow-up signal source operated by said servo motor and connected to the input of said amplifier; and means operated by said servo motor and controlling said autopilot means.

13. In an aircraft flight control apparatus wherein a signal voltage varying in accordance with the desired increment in velocity of the craft in a direction to affect its flight path is provided, in combination: automatic pilot means for steering said aircraft; filter means adapted to receive said signal voltage; means for adjusting the time constant of said filter in accordance with the range of an object from said aircraft; an amplifier; a servo motor connected to the output of said amplifier; means for controlling said autopilot means from said servo motor; feedback means driven by said servo motor; and means for connecting said filter and said feedback means to the input of said amplifier; means for varying the amount of feedback from said feedback to said amplifier in accordance with the range of an object from said aircraft.

14. In an aircraft flight control apparatus wherein a signal voltage varying in accordance with an increase in the horizontal velocity of the aircraft is provided, in combination: autopilot means for controlling the heading of such craft; servo means for controlling the operation of said autopilot means; an amplifier having its output connected to said servo means; a control circuit connected to the input of said amplifier; a filter adapted to receive said signal voltage; means for adjusting the time constant of said filter in accordance with the distance of said craft from an object and the angular elevation of said object above a plane defined by the longitudinal and lateral axes of said craft; follow-up means operated by said servo motor and developing a control voltage; and means for connecting said filter and said follow-up means in said control circuit whereby the two signals cause the servo means to be placed in null position.

15. An aircraft control apparatus wherein a first signal voltage varying with the linear rate of change of displacement in a direction is supplied, autopilot means for controlling an attitude control surface of said craft to vary its attitude in said direction; electric motor means operative to control said automatic pilot; signal input circuit means controlling operation of the motor means; amplifier means having its output connected to said motor means; follow-up means operated by the motor means to supply a voltage to the amplifier input; gain control means for varying said first signal in accordance with the true airspeed of the aircraft; means including a filter connected to said gain control means for filtering out unwanted components of said first signal; means for adjusting the time constant of said filter in accordance with the distance of the craft from an object; means for supplying the output of said filter to said amplifier input; and means responsive to the speed of the motor means operative to supply an additional voltage signal to the input of said amplifier.

16. In control apparatus for navigating an aircraft having bank attitude changing means; means for producing a control signal commanding a bank angle in accordance therewith to vary the displacement rate of the craft in a horizontal direction; means for modifying said signal in accordance with the bank angle of the craft to provide a resultant signal, to effect the rate of turn of the craft in a horizontal plane proportional to the ordered signal; means for amplifying said resultant signal; reversible motor means controlled from said amplifier means and adapted to control said roll attitude changing means; and motor displacement means actuated from said motor means and developing a follow-up signal in opposition to said resultant signal.

17. Apparatus for automatically controlling an aircraft toward a moving object, the aircraft including means for providing a first signal varying with the vertical rate of change of linear displacement of the craft and means for providing a second signal varying with the velocity of the craft in a horizontal plane, in combination: filter means having a variable time constant and adapted to receive said first signal; means for adjusting the time constant of said filter in accordance with the distance of the craft from said object; servo means connected to said filter and providing an output which is a time integration of the filtered signal; means for controlling the vertical attitude of said output from said craft from said servo means; second filter means having a variable time constant and adapted to receive said second signal; means for adjusting the time constant of said second filter in accordance with the distance of the craft from said object and the angle of said object above the plane defined by the lateral and longitudinal axes of said craft; servo means connected to said second filter to receive an input signal and controlled thereby; follow-up means operated by said servo means for providing a rebalance signal opposing said input signal; and a signal generator operated by said servo means and controlling the roll attitude of said craft.

18. In an automatic flight control system for an aircraft wherein an alternating voltage signal is provided varying with the craft linear velocity, in a horizontal plane, at an angle to the horizontal component of the line connecting an object to said aircraft, in combination: filter means having an adjustable time constant adapted to receive said signal voltage; means for adjusting the time constant of said filter in accordance with the distance of the craft from said object; electric motor means operative to control the direction of flight of the aircraft; amplifier means having an input and having its output connected to said motor means; follow-up means operated by the motor means operative to supply a voltage to the input of said amplifier; and means connecting the input of said amplifier to the output of said filter means to cause the craft to turn and change its velocity in said horizontal plane.

19. In an automatic pilot for an aircraft having direction maintaining means and attitude maintaining means for maintaining the craft level about its pitch and roll axes; means for producing a control signal calling for the craft to change vertical velocity to a different but predetermined rate; filter means having an adjustable time constant and adapted to receive said signal; means for adjusting the time constant of said filter in accordance with the distance of said craft from an object also having a vertical velocity; electric motor means adapted to control said automatic pilot to cause the craft to alter its pitch attitude to vary its vertical displacement rate; signal input circuit means connected to said filter and controlling operation of said motor means; follow-up means operated by the motor means to supply a voltage opposing that from said filter means; and a means responsive to the speed of the motor means and operative to supply a voltage to the input means additionally opposing the voltage from said filter means.

20. Apparatus for automatically controlling the flight path of an aircraft toward a fixed point, the aircraft including means for providing a signal corresponding to a rate of vertical change of velocity of said aircraft; autopilot means for controlling the pitch attitude of said aircraft to vary its vertical velocity; an electric motor means adapted to receive said signal; follow-up means operated by said motor means for developing a rebalance signal; means including a capacitor for connecting said follow-up signal in opposition to said first signal; means for varying the amount of follow-up signal fed back in accordance with the distance of the aircraft from said object; and means operated by said motor means and controlling said autopilot means whereby said signal controls craft pitch attitude rate.

References Cited in the file of this patent
UNITED STATES PATENTS

| | | |
|---|---|---|
| 2,420,017 | Sanders | May 6, 1947 |
| 2,498,730 | Williams | Feb. 28, 1950 |
| 2,769,132 | Jarvis | Oct. 30, 1956 |